Figure 1:
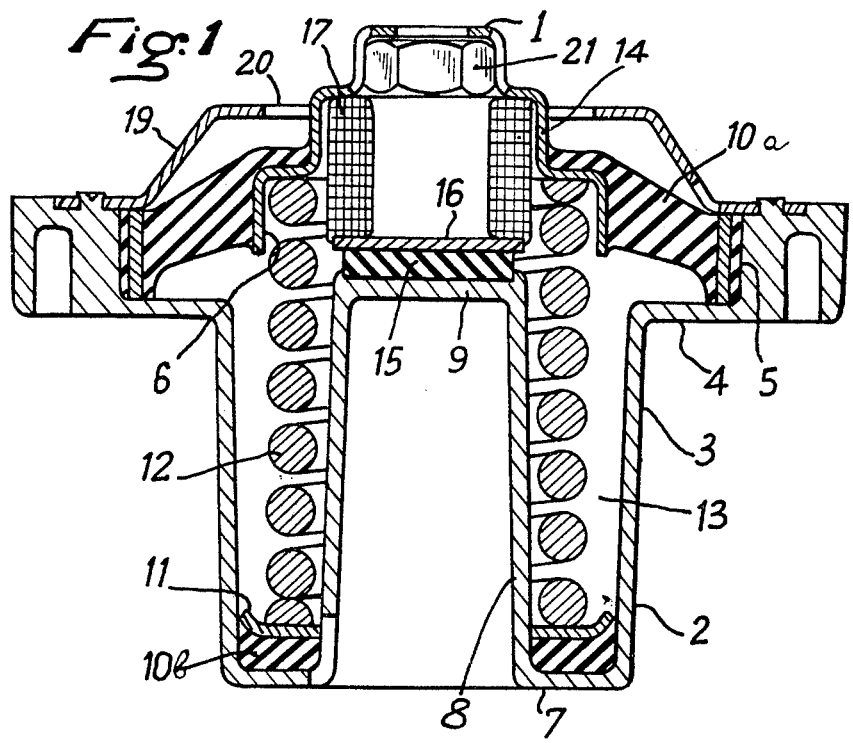

United States Patent [19]

Vernier

[11] 3,883,101
[45] May 13, 1975

[54] VIBRATION DAMPING MEANS

[75] Inventor: Pierre Vernier, Lausanne, Switzerland

[73] Assignee: ARFINA Anstalt Fuer Continentale und Uebersee Finanzinteressen, Vaduz, Liechtenstein

[22] Filed: July 15, 1974

[21] Appl. No.: 488,768

[52] U.S. Cl. ............... 248/9; 248/21; 248/358 R
[51] Int. Cl. ..... E02d 27/44; F16m 5/00; F16f 15/00
[58] Field of Search ..... 248/8, 9, 10, 21, 24, 358 R, 248/358 AA; 267/151, 178

[56] References Cited
UNITED STATES PATENTS

| | | |
|---|---|---|
| 1,912,451 | 6/1933 | Hibbard .................. 248/21 |
| 2,032,659 | 3/1936 | Hussman ................. 248/21 |
| 2,270,335 | 1/1942 | Parkinson et al. ........ 248/21 |
| 2,634,069 | 4/1953 | Drake et al. ............. 248/24 |
| 2,678,796 | 5/1954 | Roy ..................... 248/21 X |
| 2,687,269 | 8/1954 | Titus et al. ............. 248/24 X |
| 2,908,456 | 10/1959 | Gertel ................... 248/24 |
| 3,008,703 | 11/1961 | Slemmons et al. ....... 248/358 R X |
| 3,052,435 | 9/1962 | Roller .................... 248/8 |
| 3,610,604 | 10/1971 | Terai .................... 188/1 B X |

Primary Examiner—J. Franklin Foss
Attorney, Agent, or Firm—Brisebois & Kruger

[57] ABSTRACT

Vibration damper comprises two opposed cups, with the open end of one cup inside the other, said cups being separated by elastomeric pads which act in both compression and shear, at least one coil spring, and at least one wire mesh pad which acts in compression.

7 Claims, 2 Drawing Figures

1

VIBRATION DAMPING MEANS

SUMMARY OF THE INVENTION

This invention relates to an improved vibration damper which is particularly adapted to be interposed between the chassis of an automotive vehicle and a device subjected to vibrations, such as a motor.

Vibration dampers intended for this purpose usually comprise damping pads of elastomeric material. These dampers are not satisfactory for the damping of low frequency vibrations, and this makes them particularly disadvantageous for use in automobiles.

Other known vibration dampers consist of pads of knitted metallic wire, but these dampers have many disadvantages and, in particular, do not satisfactorily impede the propagation of sound so that vehicles comprising such dampers are very noisy.

Dampers have also been proposed which comprise both elastomeric pads working in compression or shear and pads of knitted metallic wire. These dampers represent a substantial advance over the dampers previously described but are not entirely satisfactory because they are complex to assemble, have a large number of parts, and certain of these parts deteriorate rapidly due to fatigue and wear. Moreover, these known dampers may become noisy, principally because of the large number of parts which they comprise and the fatigue of certain of these parts.

The present invention proposes to supply a damper capable of being used especially in vehicles and permitting an excellent damping of both vibrations and sound over the entire range of troublesome frequencies.

A damper according to the invention is characterized by the fact that it comprises a first rigid member adapted to be attached to one of the parts of the assembly to be damped;

a second rigid member coaxial with the first and having the shape of a cylindrical cup having at its open end a zone which is radially spaced from a corresponding zone in the first rigid member and an upward projection in its base coaxial with the cylindrical wall and defining a substantially annular intermediate space therebetween, said projection having itself an inner bottom;

a pad of knitted metallic wire interposed between the first rigid member and the inner bottom to act in an axial direction;

a first elastomeric pad positioned between the radially spaced zones of the two rigid members to act in shear;

a helical spring positioned in the annular space and bearing on the first rigid member and on the bottom of the second rigid member;

a second elastomeric pad which is annular in shape positioned between the bottom of the second rigid member and the end of the spring;

and a third elastomeric pad positioned between the inner bottom of the second rigid member and the pad of knitted metallic wire.

In a first embodiment of the invention the annular space inside which the spring is positioned communicates with the atmosphere to avoid the creation of excess pressure during operation. On the contrary, in a second embodiment of the invention, the assembly of the damping device is fluid-tight and the annular volume defined within the wall, the reinforcement of the second rigid member and the elastomeric pad which works in shear is completely filled with a material having the consistency of grease, for example, a highly viscous silicone grease.

These two embodiments permit the separate regulation over a very wide range of the characteristics of stiffness and damping. In particular, the introduction of a grease makes possible exceptionally high damping values.

Moreover, the great diversity in the materials used (elastomers, metallic spring, metallic pads, and grease) make it possible, by adjusting the reciprocal influences of the products with respect to each other, to regulate the characteristics of the damper at will.

Figure 2:
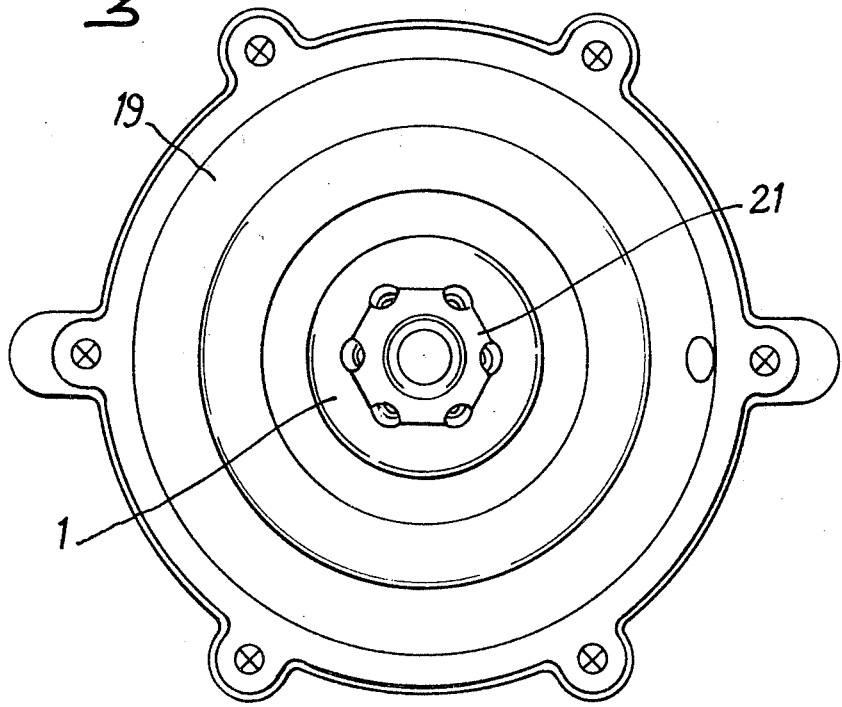

Other advantages and characteristics of the invention will appear from a reading of the following description given purely by way of illustration and example, with respect to the accompanying drawings, in which:

FIG. 1 is an axial sectional view through a damper according to the invention; and FIG. 2 is a bottom plan view of this vibration damper.

The illustrated vibration damper comprises two coaxial members 1 and 2. The upper member 1 is in the form of a cup, open toward the bottom, with two shoulders imparting thereto the shape of a stairway having three steps. A nut 21 is locked in the diametrically smallest part of the member 1. This nut permits a vibrating device of any type, such as a motor, to be attached thereto.

The member 2 is in the form of a cup having a cylindrical wall 3 the upper part of which, beyond an externally projecting shoulder 4, cylindrical inner surface 5 positioned substantially around the part 6 of the rigid member 1 having its maximum diameter. The cylindrical wall 2 is connected to a bottom 7 of the central part of which has an upwardly projecting portion encircled by a substantially cylindrical wall 8 which leads to the inner bottom portion 9. The inner bottom portion 9 at the upper end of the projecting part is at substantially the same level as the shoulder 4. The two rigid members 1 and 2 are made of a strong metal such as steel.

Between the parts 5 and 6 of the two rigid members is a radial elastomeric pad which tends to act in shear that is to say, in the direction of the common axis of the rigid members 1 and 2.

The elastomeric pad may be made, for example, of neoprene.

In the annular bottom 7 of the rigid member 2 is a second annular elastomeric pad 11 which is surmounted by a steel washer. The lower end of a compression spring 12 positioned in the annular space 13 between the walls 2 and 8 rests on the steel washer. The upper end of this spring 12 bears against the internal shoulder of the rigid member which connects the wall portion of greatest diameter 6 to the wall portion of intermediate diameter 14 in the rigid member 1. It will thus be understood that the spring 12 functions to interpose its stiffness between the two rigid members 1 and 2.

On the inner bottom 9 of the rigid member 2 is a third pad of elastomeric material 15 having substantially the same thickness as the pad 10. This third pad 15 is surmounted by a metallic disc 16 having a substantially corresponding diameter which supports a pad of knitted metallic wire 17 having an annular cross section. The knitted wire is made in a well known manner so that the damping function of this pad 17 takes place in the axial direction.

Such pads, which are well known in themselves, are characterized by a frequency of absorption which remains constant regardless of the dynamic load applied to the pad.

The upper end of the pad 17 abuts the second shoulder 18 of the rigid member 1.

A protective member 19 fixed to the rigid member 2 may advantageously be provided to protect the pad 10. This protective member 19 has an orifice 20 through which the rigid member 1 passes loosely.

In a first embodiment, orifices may be provided in the walls 2 and 8 to place the inner space 13 in communication with the ambient atmosphere. On the contrary, in a second and improved embodiment, this annular space 13 may be isolated from the outside by rendering the various surfaces fluid-tight, and the annular space 13 is then filled with a grease, for example a silicone grease, which operates by deformation of the annular volume, provoked during movement of the pad 10, which operates in shear.

The damping pad according to the invention has in the low frequency range, in particular from 2 to 30 Hz, a low resonant frequency and a high damping effect, which makes it particularly adapted for insulation purposes in vehicles. Above 50 Hz a very important attenuation of noise is obtained with low damping at high frequencies.

Moreover, as compared to various known dampers comprising elastomeric members and woven wire pads, the damper according to the invention has very great strength which permits its practically indefinite use on vehicles under the most difficult conditions. Furthermore, in the absence of moving metallic parts inside the damper, (other than the metallic spring), it prevents any risk of fatigue of such parts and eliminates the disadvantages due to the transmission of noise by such parts. The damper described and illustrated is capable of being modified in many particulars and it will be appreciated that the invention is not limited to the exact embodiment illustrated. For example, it is possible to place metallic inserts in the pad 10. Moreover, when the internal volume 13 is filled with grease, it is possible in certain applications to eliminate the spring 12 and the pad.

What is claimed is:

1. Vibration damping means which comprises:
   a first rigid member (1) adapted to be attached to one of two members to be damped;
   a second rigid member (2) coaxial with the first rigid member and having the shape of a cylindrical cup, with a peripheral wall portion (5) at its open end which is radially spaced from a corresponding wall portion (6) of the rigid member (1);
   said second rigid member having a projection (8) which extends upward from its bottom (7) in the form of an inner cup coaxial with the cylindrical wall (3) of the rigid member to define a substantially annular intermediate chamber (13) therebetween, said upward projection (8) having itself an inner bottom (9);
   a pad of knitted metallic wire (17) between said first rigid member (1) and said inner bottom (9) which acts in the axial direction;
   a first elastomeric pad (10) positioned between the radially spaced zones (5), (6) of the two rigid members (1), (2) to act in shear;
   a helical spring (12) positioned in the annular space (13) and bearing on the first rigid member (11) and on the annular bottom (9) of the second rigid member (2);
   a second annular elastomeric pad (10) positioned between the bottom (7) of the second rigid member (2) and the end of the spring (12); and
   a third elastomeric pad (15) between the inner bottom (9) of the projection (8) and the knitted metallic wire pad (17).

2. Vibration damping means as claimed in claim 1 in which the first rigid member is fixed to a mounting nut (21).

3. Vibration damping means according to claim 1 in which the walls (3), (8), (10) defining the annular chamber (13) are fluid-tight and said chamber is completely filled by a material having the consistency of grease.

4. Vibration damping means as claimed in claim 1 in which the annular space (13) is in communication with the atmosphere.

5. Vibration damping means as claimed in claim 1 in which the second rigid member (2) is cup-shaped and has an upper end of increased diameter connected to the remainder of said second rigid member by a supporting shoulder (4).

6. Vibration damping means comprising:
   an outer cup (2);
   an inner cup (1) having its open end projecting into the open end of the outer cup;
   a projection (8), (9), extending from the bottom of the outer cup toward the inner cup and defining an annular chamber (13) between said projection and the outer wall of said outer cup;
   coil spring means (12) in said chamber biasing said cups apart;
   wire mesh damping means (17) between said projection and inner cup; and
   elastomeric damping means acting in shear positioned between the inner surface of the open end of said outer cup and the outer surface of the open end of the inner cup.

7. Vibration damping means as claimed in claim 6 comprising at least one elastomeric pad acting in compression between said cups.

* * * * *